May 29, 1934.  J. A. GALLEY ET AL  1,960,737
PEA SHELLING DEVICE
Filed Jan. 9, 1933

Inventors
John Alfred Galley and
Ernest Valentine Galley
By Bixinger, Atty.

Patented May 29, 1934

1,960,737

UNITED STATES PATENT OFFICE 1,960,737

PEA-SHELLING DEVICE

John Alfred Galley, Edgecliff, New South Wales, and Ernest Valentine Galley, Randwick, New South Wales, Australia Application January 9, 1933, Serial No. 650,918
In Australia October 24, 1932

4 Claims. (Cl. 130—30)

This invention relates to the extraction of peas from the pods in which they are contained, and has particular reference to devices for this purpose.

The object of the invention is to provide an improved device for the shelling of peas, which is capable of treating a quantity of peas simultaneously without damage to the peas, and which has a considerably increased output over known devices for this purpose.

In the drawing

Figure 1:
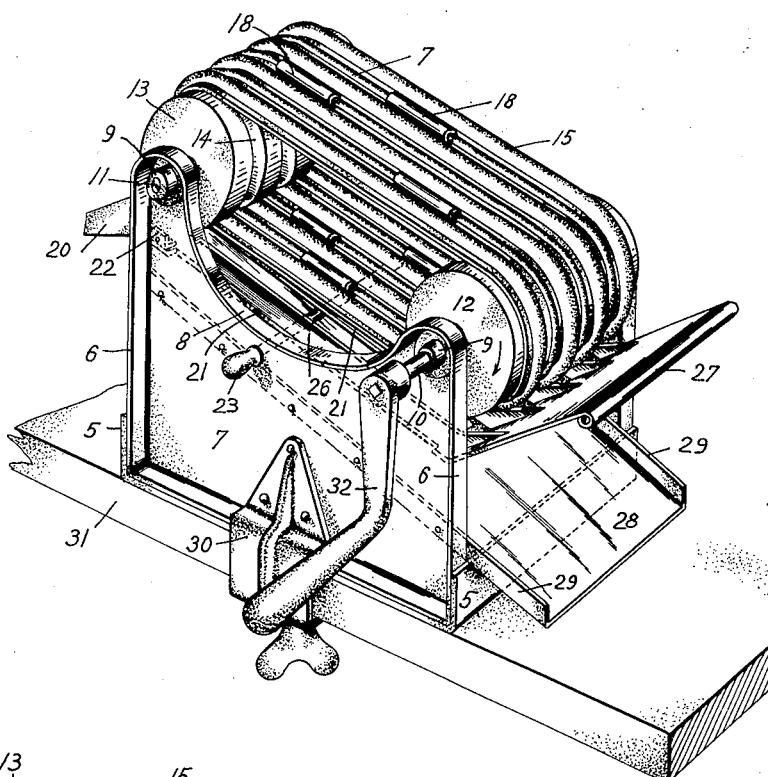
Fig. 1 is a perspective view of the complete device.

As shown in the drawing the device is formed with a base plate 4 having upturned flanges 5, 5 at its ends which are suitably secured to the peripheral flanges 6, 6 of the two side cheek plates 7, 7 of the device. The flanges at the lower edges of the cheek plates 7 seat up and are secured to the base plate 4.

The cheek plates 7, 7 are similar on the two sides of the device, and the upper edge of each is formed with a central downwardly directed recess 8. The upper corners of each cheek plate are formed with bosses 9, 9 for the reception of the transverse spindles 10 and 11. The spindle 10 is located at what is termed the "entry" end of the device, and the spindle 11 at the "discharge" end.

Upon the transverse spindles 10 and 11 are respectively mounted the similar rollers 12 and 13. The rollers are each peripherally formed with spaced grooves 14, 14 for the reception of the endless longitudinal rubber crushing bands 15, 15 which are reeved about the two rollers. The bands 15 are of circular cross-section and are formed along the two sides with flanges 16, 16 which lie upon the surfaces of the rollers 12 and 13.

Reeved about the rollers 12 and 13, intermediate the bands 15, are endless traversing bands 17, 17 of rubber, which latter bands are formed with enlarged sleeves 18, 18 at spaced points in their length.

Figure 2:
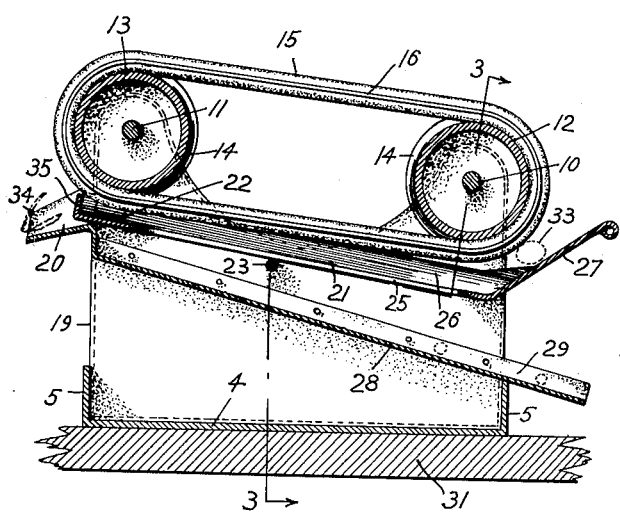
Fig. 2 is a longitudinal cross-sectional elevation thereof.

As shown in Fig. 2, the discharge end of the device is fitted with an end plate 19 secured to the side cheek plates 7, and formed with a discharge channel 20.

Figure 3:
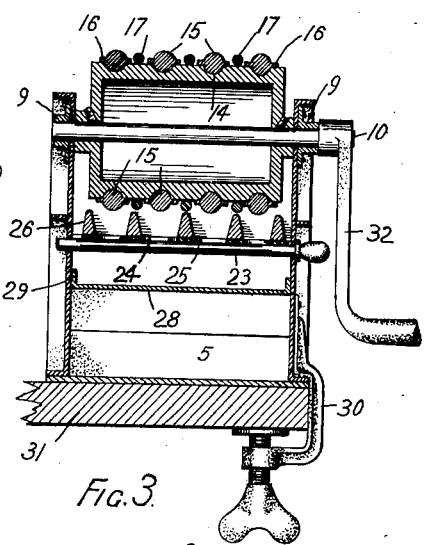
Fig. 3 is an end cross-sectional elevation on the line 3—3 of Fig. 2.

Directly underlying the lower run of the bands and the rollers is a longitudinal grid, designated generally by the numeral 21 (Fig. 2). The discharge end of the grid 21 is slidably secured by a short flange 22 on each cheek plate 7, and the centre of the grid is supported by a transverse pin 23 passing through the two cheek plates. The grid 21 may be slid out of the entry end of the device for cleaning purposes. The grid 21 is formed of a longitudinally flexible plate of spring steel in which are formed longitudinal apertures 24, 24 (Fig. 3) directly underlying each band 15 respectively. The grid ribs 25, 25 intermediate the apertures 24 have longitudinal rubber crushing bars 26, 26 mounted thereon, which bars are of substantially triangular cross-section and underlie the traversing bands 17. The grid bars are spaced slightly below the level of the bands 15 at the entry end of the device, but approach the bands towards discharge end, where the bars project substantially within the space between the bands. The grid 21 is, at the entry end of the device, formed with a feeding chute 27, and at the discharge end is fitted with a transverse stop plate 35 between the bars 26.

Underlying the grid 21 is an inclined pea chute 28 secured along its side flanges 29, 29 to the cheek plates 7, 7 respectively.

One cheek plate 7 carries a suitable clamp 30 for securing the device to a table 31, and the spindle 10 is fitted with a crank handle 32 for rotating the roller 12 and with it the bands 15 and 17.

The operation of the device is as follows:

Pea pods, such as 33 (Fig. 2) are fed transversely on to the inclined feed chute 27, and the handle 32 is rotated to revolve the roller 12 in the direction of the arrow in Fig. 1. The bands 15 engage the pea pods and roll the same over the grid bars 26, with the pods in a transverse disposition. The pressure of the bands 15, and the rolling movement of the pods splits the same, and the peas are disgorged therefrom and fall (or are forced) through the apertures 24 of the grid 21 on to the chute 28, whence they are discharged to a suitable receptacle. Rotation of the bands progresses the emptied pods through the device, whence they are discharged to the channel 20, as shown at 34 in Fig. 2. At the discharge end of the grid the transverse stop plate 35 prevents the discharge of loose peas with the pods. Should any pods flatten to such an extent that they are not moved by the bands 15, such pods are engaged by the sleeves 18 on the traversing bands 17 and are progressed thereby. The provision of side flanges 16 on the bands 15 extend the latter over substantially the whole space between the bars 26, and so increase the efficiency of the crushing operation.

The grid 21 being supported only at the discharge end and at the centre, and also being formed of spring steel, allows a certain flexibility at the entry end of the device. This flexibility, coupled with the increased spacing between the bands 15 and the bars 26 at the entry end of the device, ensures that the pods are smoothly and evenly engaged and rolled over the bars. As the pods are rolled towards the discharge end, the decreasing spacing between the bands and the bars causes an increase of pressure on the pods and forces from the latter any firmly adhering peas.

Owing to the construction of the grid with apertures through which the peas forced from the pods readily escape, practically no crushed peas result from the shelling operation.

The device may be of any size required, and increased length of bars and bands improves the efficiency of the shelling operation.

We claim:

1. A pea shelling device comprising a framing, rotatably and transversely mounted in said framing two grooved cooperating rollers, a plurality of endless rubber crushing bands, having side flanges thereon, reeved about said rollers and located in the grooves therein, a plurality of rubber traversing bands, having projections thereon, reeved about the said rollers intermediate the crushing bands, a grid mounted in said framing, on said grid a plurality of grid bars located in juxtaposition to, and longitudinal parallelism with, the said bands, the said bars being of substantially triangular cross section and disposed with an apex of said section directed towards the interspace between the said crushing bands, apertures in said grid intermediate the said bars, and means for rotating one of said rollers to roll and progress pea pods between the bands and the grid bars.

2. A pea shelling device according to claim 1, in which the grid bars are spaced slightly from the bands at the entry end of the device, and are disposed close to the bands at the discharge end of the device.

3. A pea shelling device according to claim 1, in which the grid is flexible and the grid bars are of rubber.

4. A pea shelling device comprising, in combination, a framing, rotatably mounted in said framing two spaced rollers in mutually parallel arrangement, a plurality of endless rubber bands in spaced parallel arrangement reeved about said rollers, a fixed grid structure located under the lower run of said bands, the bars of said grid extending longitudinally of the machine and registering with the spaces between said bands, a feed tray constituted by an upwardly inclined extension of one end of the grid structure, on the grid bars rubber facing strips which extend to said feed tray, a stop at the other end of said grid to prevent released peas from being discharged over said end, a pod discharge chute at the last mentioned end of said grid, a pea-receiving inclined tray underlying said grid, and means for rotating one of said rollers.

JOHN ALFRED GALLEY.
ERNEST VALENTINE GALLEY.